United States Patent [19]

Lange

[11] Patent Number: 4,691,232
[45] Date of Patent: Sep. 1, 1987

[54] X-RAY IMAGE CONVERTER

[75] Inventor: Gottfried Lange, Erlangen, Fed. Rep. of Germany

[73] Assignee: Siemens Aktiengesellschaft, Berlin and Munich, Fed. Rep. of Germany

[21] Appl. No.: 534,433

[22] Filed: Sep. 21, 1983

[30] Foreign Application Priority Data

Sep. 29, 1982 [DE] Fed. Rep. of Germany ....... 3236155

[51] Int. Cl.$^4$ ......................... H04N 5/32; G03G 5/16
[52] U.S. Cl. ................................. 358/111; 250/327.2
[58] Field of Search ...................... 378/99, 100; 382/6; 358/111; 364/414; 250/327.2, 213 VT

[56] References Cited

U.S. PATENT DOCUMENTS

| 2,864,031 | 12/1958 | Smith | 315/12 |
| 3,213,315 | 10/1965 | Lempert | 315/10 |
| 4,161,755 | 7/1979 | Haendle et al. | 378/99 |
| 4,276,473 | 6/1981 | Kato et al. | 250/327.2 |
| 4,284,889 | 8/1981 | Kato et al. | 250/327.2 |
| 4,320,296 | 3/1982 | Ishida et al. | 250/327.2 |
| 4,346,326 | 8/1982 | Driard et al. | 313/388 |
| 4,400,619 | 8/1983 | Kotera et al. | 250/327.2 |
| 4,468,744 | 8/1984 | Kakegawa et al. | 364/414 |
| 4,472,737 | 9/1984 | Iwasaki | 358/111 |
| 4,616,129 | 10/1986 | Yamada et al. | 250/327.2 |

FOREIGN PATENT DOCUMENTS 0022564 1/1981 European Pat. Off. .
1150919 10/1966 United Kingdom .

OTHER PUBLICATIONS

S. P. Keller, "Storage Device Using Phosphors", *IBM Technical Disclosure Bulletin*, vol. 1, No. 1, Jun. 1958.

Primary Examiner—Janice A. Howell
Attorney, Agent, or Firm—John F. Moran; Lawrence C. Edelman

[57] ABSTRACT

The invention relates to an x-ray image converter for use with an x-ray phosphorescent screen which includes means for scanning the screen with a radiation source, as well as detectors for converting light from the exposed phosphorescent screen into a video signal sequence and a further device for the conversion of this signal sequence thus obtained into a visible picture. For such a converter it is desirable to obtain a simple arrangement which permits an interference-free signal which requires a short processing time (less than 10 sec). The invention provides that the phosphorescent screen is subdivided into a plurality of partial areas and to each of them a detector is allocated, which is interfaced to a memory and means for analyzing the image parts and for generating a composite visible picture. An x-ray image converter according to the invention is usable in particular in medical radiodiagnostics.

4 Claims, 4 Drawing Figures

X-RAY IMAGE CONVERTER

BACKGROUND OF THE INVENTION

The invention relates to x-ray converters, in particular, to an image screen divided into partial areas each having a detector followed by a storage device.

Image converters are used for generating visible x-ray pictures and optionally also for recording them. To this end the x-ray pictures are stored in a screen which contains a phosphorescing luminophor. The luminophor catches photoelectrons formed by x-ray absorption in deep traps. By subsequent scanning with a beam of an infrared laser the trapped electrons can be exposed. They lead to the emission of light flashes which are supplied via a fiber optical system to an photo multiplier (PM). The electrical signal sequence contained in this PM detector is processed synchronously with the laser scanning of the luminophor layer and can then be displayed on a television monitor. For an image area of 300×300 mm it takes as long as two to three minutes to develop a visible picture. Additionally, the phosphorescent screen must be brought from the x-ray room to a separate read-out apparatus (scanner). Furthermore, a high-precision mechanism is needed to move the photographic plate line by line during an actual read-out. Another disadvantage is that between the exposed areas and the detector disturbances arise which may lead to inferior images.

SUMMARY OF THE INVENTION

It is an object of the present invention to disclose, for an x-ray image converter, a simple arrangement which yields a high quality signal, free of disturbances, from an image screen in a relatively short read-out time (less than 10 sec).

The point of departure for the solution of the problem at hand is that with a subdivision of the image area smaller scanning ares are obtained. Consequently, a detector assigned to a respective partial area can be brought closer to the area, because an optical coupling takes place via a rigid, conical fiber optical system. As compared with the use of a glass fiber coupling between the read-out area of the storage screen and a detector, this brings about also an improvement of the image in the sense of a higher resolution, because the glass fiber plate receives the light emitted from the luminescent screen only to a more limited aperture angle.

With separate simultaneous scanning of the partial areas, which are smaller than the total area, a shortening of the scanning time is possible as well. This is due simply to the fact that for the reading out of a stored image the movement of the laser beam is the only step to be carried out mechanically. With the subdivision method, the scanning areas and hence also the time required for scanning them are subdivided. Since the mechanical step is the slowest as compared with the other steps which are carried out electronically, a substantial shortening of the entire reproduction process is achieved. All signal processing operations and also the stringing together of partial signal sequences as well as any additionally desired electronic control of the image data, such as brightness, contrast, etc., are insignificant as compared to the scanning operation.

An x-ray image converter according to the invention can actually be effected with the use of the materials and systems familiar from prior art, as they are described for instance in the European patent document EP-OS 0022564 and its corresponding U.S. Pat. No. 4,400,619 of Kotera et al. filed Aug. 23, 1983, which is herein incorporated by reference.

Other features and advantages of the invention will be apparent from the following description of the preferred embodiments, and from the claims.

For a full understanding of the present invention, reference should now be made to the following detailed description of the preferred embodiments of the invention and to the accompanying drawings.

DETAILED DESCRIPTION

Figure 1:
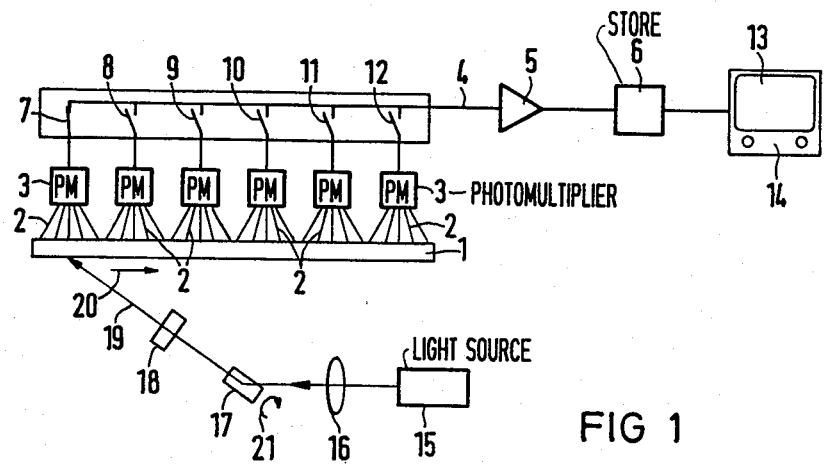
FIG. 1 shows schematically a transverse section through an image converter according to the invention.

In FIG. 1, 1 denotes a luminescent screen which contains as the phosphorescent luminophor, lanthanum oxide bromide ($LaO_2Br$), barium florochloride (BaFCH), yttrium oxide sulfide ($Y_2O_2S$), lanthanum oxide sulfide ($LaO_2S$) or the like doped with rare earth metals. Following this luminescent screen are several fiber optical systems 2, which lead to photomultiplier electron multipliers (PM) 3. These photomultipliers 3 are then connected via a line 4 and an amplifier 5 to a storage device 6, in such a way that by means of switches 7 to 12 the signals from the PMs 3 are transmitted serially. From the storage device the image can then be composed on a luminescent screen 13 of a television monitor 14 from the signals of the PMs 3 using an electronic processing system. The actual generation of the signals is effected by exposing the screen 1 by means of an infrared beam 19 delivered by a laser 15 and passing through a lens 16 and deflection device 17 as well as an opto-acoustic deflector 18. The scanning direction is indicated by an arrow 20.

The six photomultiplier electron multipliers 3 visible on FIG. 1 are arranged horizontally as shown along the arrow 20. Because we are dealing in this example with a square image format, photomultiplier electron multipliers are also arranged depthwise, resulting in a total of 36 PMs arranged in a matrix format. With such an arrangement, when scanning by means of beam 19 which, as indicated by arrow 21, is set into scanning motion by the deflection means 17, the beam pattern stored in the screen is triggered and released in the form of phosphorescent light. This light then passes via the fiber optical systems 2 into the photomultiplier electron multipliers 3. There, video signals are obtained successively, which are then stored in the storage device 6 via the switches 7 to 12 and line 4. After completion of the scanning of screen 1 by means of beam 19, the entire signal sequence from storage device 6 is transmitted to the monitor 14, where a graphic display takes place at screen 13.

Figure 2:
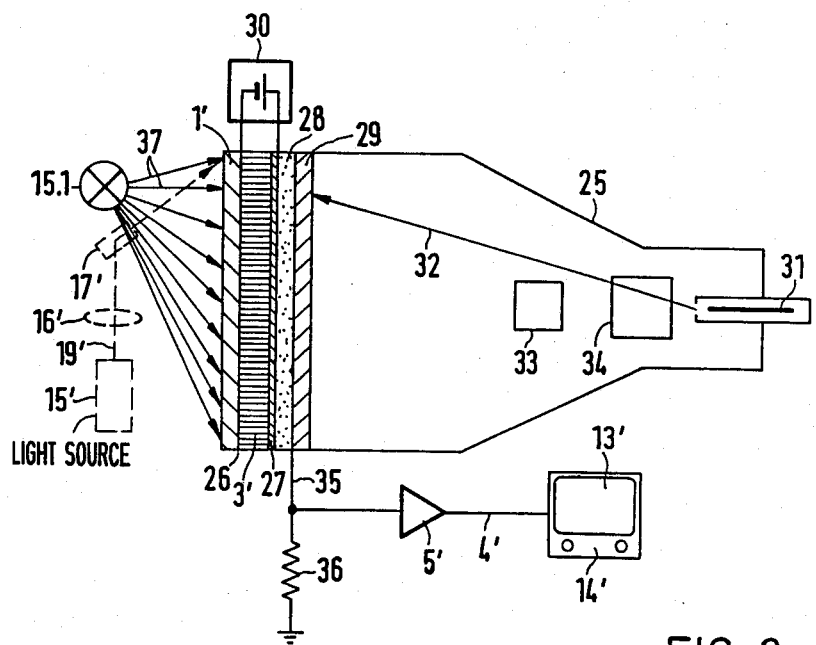
FIG. 2 shows a modification where a multi-channel plate and a photoconductive layer with scanning electron beam are used as a detector.

In the arrangement according to FIG. 2, the luminescent screen 1' is present in a cathode ray tube 25 and also comprises an input window. Following the tube 25 is a photocathode layer 26 and an electron multiplier arrangement which has the form of a multi-channel plate or flat image amplifier 3'. Following this is a thin electron-transmissive aluminum layer 27 which is covered with an electron beam-sensitive luminophor layer 28, which in turn is covered by a photo-conductor layer 29, which may comprise selenium, arsenic trisulfide, lead oxide, antimonitrisulfide or the like. Between the photocathode 26 and the aluminum layer 27, a field of about 5000 V is applied by means of a voltage source 30. The photo-conductor layer 29 is electronically scanned by means of an electron gun 31 through an electron beam 32, which is deflected by deflection coils 33 and 34. The signal is then transmitted via a line 35, which is grounded through a resistor 36, and via an amplifier 5' as well as a line 4' to the monitor 14 ' where it is displayed on the screen 13'.

The retrieval of information from the screen 1' can, as shown in FIG. 2, be effected with a laser scan device 15', 16', 17', 19', or alternatively an infrared lamp 15.1 may be used for the generation of the signal, which lamp, as indicated by arrows 37, irradiates the entire phosphorescent screen. The generation of the signal is then effected by the fact that the storage screen 1', in which the x-ray picture is stored, is exposed to infrared light. According to the luminance distribution, the emitted light triggers in the photocathode 26 photoelectrodes which are amplified in the multi-channel plate 3' and are again transformed into a luminous image in the luminophor layer 28. The luminous image varies the charge on the storing photoconductor layer 29, and this charge image is scanned by means of electron beam 32.

With the cathode ray tube 25 shown in FIG. 2, the construction of which corresponds to that of a television camera known as Vidicon, the use of cesium iodide (CsI) for luminophor layers is also possible, because the storing photoconductor layer 29 is also sensitive for the wavelength of CsI. The exposure of the phosphorescent storage layer can be effected also with an intensive infrared flash from a flash lamp. Thereby x-ray pictures can be taken rapidly one after another, as the time-consuming laser scanning process would be eliminated.

Figure 3:
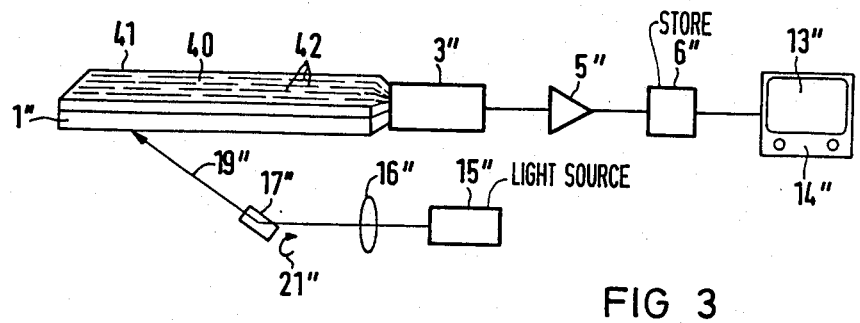
FIG. 3 shows an arrangement in which the phosphorescent layer is applied on a fiber optical plate.

According to FIG. 3, the phosphorescent layer of the screen 1" can be applied on a glass plate 40, the opposite side of which is provided with a metal mirror 41. The glass plate itself is constructed in the form of an optical prism system with layer type location-dependent index of refraction which, as indicated by lines 42, guides the light into photomultipliers 3". The scanning can take place in a manner analogous to FIG. 1, with a scanning device identical with that of FIG. 1. Accordingly, double prime symbols have been chosen for reference numerals to illustrate this correspondence. However, according to the present invention, the fiber optical system is realized by the compact glass plate 41, and the light is guided via a conico-circular optical fiber 42 over the total area onto a PM 3".

Figure 4:
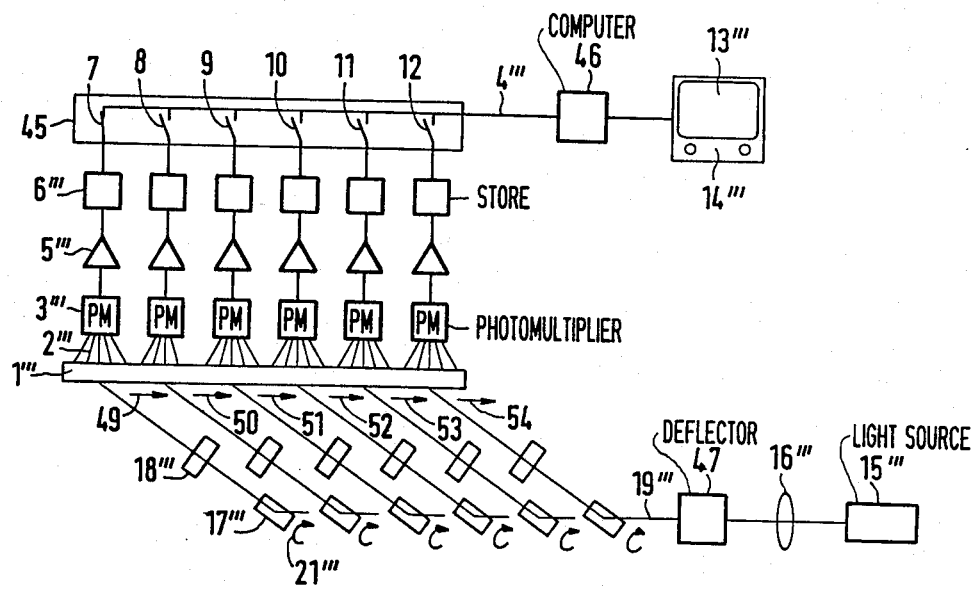
FIG. 4 shows an arrangement where a simultaneous multiple scanning device is used.

In FIG. 4, the phosphorescent screen 1''' has as in FIG. 1, an arrangement of electron multipliers 3'''. These are then connected via amplifiers 5''' and storage devices 6''', multiplexer 45 and a line 4''' to a computer 46, whence the signal can be brought to a television monitor 14'''. The main difference from the arrangement according to FIG. 1 consists in the design of the scanning device. The laser source 15''' with the lens 16''' and an opto-acoustic deflector 47 is still largely the same as in FIG. 1. But there is provided a plurality of deflection devices 17''' which divide the scanning beam 19''' into a plurality of beams 48 which, as indicated by double arrows 49 to 54, scan partial areas of the screen 1'''.

When using photomultipliers 3''' arranged in a 3×3 to 6×6 matrix, which are coupled via fiber optical systems 2''' to the phosphorescent screen 1''', 3 or respectively 6 scanning beams 48 are used. These then scan the individual partial regions of screen 1''' synchronously for all photomultipliers 3'''. The signals thus obtained are amplified via the amplifiers 5''' and are received in an intermediate memory 6'''. At the end of scanning of these signals they are combined to form a total image, which then appears on the luminescent screen 13''' of the monitor 14'''. The intermediate memories 6''' are interrogated by a computer 46 via a multiplexer 45 and a line 4'''. In the computer the total iamge is composed and subsequently displayed on the television monitor 14'''. Additionally, image manipulations can be carried out in the computer.

There has thus been shown and described a novel apparatus for converting X-ray images which fulfills all the object and advantages sought therefor. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

What is claimed is:

1. An x-ray image converter for generating an image from an x-ray phosphorescent screen, comprising:
    a screen having a stimulable phosphor layer wherein an x-ray image is stored by exposure to x-ray radiation;
    a plurality of scanning means for synchronously scanning a corresponding plurality of predetermined partial areas of said screen with lightwave radiation after exposure to x-ray radiation to produce visible image information from each of said partial areas;
    a plurality of detector means, each detector means optically coupled to a respective one of said partial areas of said screen for receiving the image information from said screen and for converting said information into a video signal sequence;
    storage means for storing therein information related to said video signal sequence; and
    a display device for accessing said information stored in said storage device and processing said information to generate a visible picture,
    so that due to said plurality of detector means, said visible picture may be generated in high resolution.

2. The x-ray image converter according to claim 1, wherein said plurality of detector means comprise a plurality of electron multipliers.

3. A method of converting a image from an x-ray phosphorescent screen having a stimulable phosphor layer wherein an x-ray image is stored by exposure to x-ray radiation, into a visible picture, comprising the steps of:
    (a) synchronously scanning a plurality of predetermined partial areas of said screen for exposing said phosphorescent screen to light wave radiation to cause emission of light flashes from said partial areas of said screen;
    (b) detecting said light with a plurality of detectors each closey optically coupled with a respective one of said predetermined partial areas of said screen;

(c) converting with said plurality of detectors said light into a signal sequence;
(d) storing information related to said signal sequence in a memory;
(e) accessing said information stored in said memory and converting said information into a visible picture; and
(f) displaying said picture.

4. An x-ray image converter for generating an image from an x-ray stimulable phosphorescent screen wherein an x-ray image is stored by exposure to x-ray, comprising:

means for synchronously scanning a plurality of sections of said screen to expose said sections of said screen with stimulating light within the range of the stimulating light wavelength of the stimulable phosphorescent screen, so as to cause said sections to emit radiant image information;

a plurality of detecting means, each detecting means being coupled to a corresponding one of said sections and responsive to the radiant image information from its corresponding section, the detecting means converting said information into a video signal indicative of the radiant image of the corresponding section;

an electronic processing system for sequentially assembling the video signals from each of the detecting means of the plurality of sections of said screen to provide an assembled video signal indicative of all said sections; and display device means for providing a display from the assembled video signal so that due to said plurality of detector means the resolution of the display is improved and free of noise disturbances.

* * * * *